United States Patent
Reilly et al.

(10) Patent No.: US 9,669,330 B1
(45) Date of Patent: Jun. 6, 2017

(54) WWTP SENSOR CARTRIDGE

(75) Inventors: James P. Reilly, Vancouver, WA (US); Victoria Jelderks, Vancouver, WA (US)

(73) Assignee: Liberty Evans, LLC, Vancouver, WA (US)

(*) Notice: Subject to any disclaimer, the term of this patent is extended or adjusted under 35 U.S.C. 154(b) by 314 days.

(21) Appl. No.: 13/605,365

(22) Filed: Sep. 6, 2012

Related U.S. Application Data (60) Provisional application No. 61/531,552, filed on Sep. 6, 2011.

(51) Int. Cl.
*B01D 21/24* (2006.01)
*B01D 21/30* (2006.01)
*G01N 11/00* (2006.01)
*B01D 17/12* (2006.01)
*B01D 35/00* (2006.01)
*B01D 35/14* (2006.01)

(52) U.S. Cl.
CPC ............ *B01D 17/12* (2013.01); *B01D 21/30* (2013.01); *B01D 35/00* (2013.01); *B01D 35/14* (2013.01)

(58) Field of Classification Search
None
See application file for complete search history.

(56) References Cited

U.S. PATENT DOCUMENTS

| | | | |
|---|---|---|---|
| 3,772,193 A * | 11/1973 | Nelli et al. | 210/756 |
| 5,545,325 A | 8/1996 | Hsu et al. | |
| 5,707,513 A | 1/1998 | Jowett et al. | |
| 6,086,758 A | 7/2000 | Schilling et al. | |
| 6,383,372 B1 | 5/2002 | Houck et al. | |
| 6,393,775 B1 * | 5/2002 | Staschik | C02F 9/00 210/170.08 |
| 7,153,436 B2 | 12/2006 | Bair et al. | |
| 7,210,594 B2 | 5/2007 | Schütz | |
| 7,267,235 B2 | 9/2007 | Sharir | |
| 7,288,192 B2 | 10/2007 | Jowett | |
| 7,666,285 B1 * | 2/2010 | Cho et al. | 204/403.01 |
| 2004/0074845 A1 | 4/2004 | Hagino et al. | |
| 2004/0084379 A1 | 5/2004 | Ballard | |
| 2004/0118764 A1 * | 6/2004 | Miller | B01D 35/26 210/258 |
| 2005/0150840 A1 | 7/2005 | Vion | |

(Continued)

OTHER PUBLICATIONS

"U.S. Appl. No. 13/605,374, Examiner Interview Summary mailed Nov. 12, 2015", 3 pgs.

(Continued)

*Primary Examiner* — Richard Gurtowski
(74) *Attorney, Agent, or Firm* — Schwegman Lundberg & Woessner, P.A.

(57) ABSTRACT

Embodiments describe apparatuses, systems and methods for utilizing a configurable WWTP container having a removable sensor/controller cartridge. Said removable cartridge is configured for collecting and analyzing data for any given configuration of a WWTP container, and is positioned securely separate from the treatment compartment(s) of the WWTP container. The removable cartridge is able to monitor operation conditions of the wastewater treatment compartment(s) via control logic and at least one sensor included in the removable cartridge, and change operating parameters of the container.

14 Claims, 8 Drawing Sheets

(56) References Cited

U.S. PATENT DOCUMENTS

| | | |
|---|---|---|
| 2005/0241174 A1 | 11/2005 | Kolega et al. |
| 2005/0247609 A1* | 11/2005 | Laing et al. ............... 210/109 |
| 2007/0080112 A1 | 4/2007 | Langlais |
| 2007/0187326 A1 | 8/2007 | Bonnelye et al. |
| 2007/0215212 A1 | 9/2007 | Demeniuk |
| 2007/0215531 A1* | 9/2007 | Wawrla et al. ............. 210/101 |
| 2008/0210093 A1* | 9/2008 | Snowdon ..................... 95/284 |
| 2009/0114592 A1 | 5/2009 | Lebrun et al. |
| 2009/0211974 A1 | 8/2009 | Bonnelye et al. |
| 2009/0236280 A1 | 9/2009 | Morita et al. |
| 2010/0032373 A1 | 2/2010 | Langlais |
| 2010/0038314 A1 | 2/2010 | Vion et al. |
| 2010/0200496 A1 | 8/2010 | Graveleau |
| 2010/0282679 A1 | 11/2010 | Langlais |
| 2011/0024358 A1 | 2/2011 | Pudvay |
| 2011/0108497 A1 | 5/2011 | Stigebrandt |
| 2011/0186512 A1 | 8/2011 | Bonnelye |
| 2011/0290723 A1 | 12/2011 | Bonnelye et al. |
| 2012/0055934 A1 | 3/2012 | Reilly et al. |
| 2012/0111806 A1 | 5/2012 | Langlais et al. |
| 2013/0001146 A1 | 1/2013 | Mirault |
| 2013/0056404 A1 | 3/2013 | Malige et al. |

OTHER PUBLICATIONS

"U.S. Appl. No. 13/605,374, Non Final Office Action mailed Jun. 18, 2015", 27 pgs.

"U.S. Appl. No. 13/605,374, Response filed Nov. 6, 2015 to Non Final Office Action mailed Jun. 18, 2015", 10 pgs.

"U.S. Appl. No. 13/605,382, Response filed Oct. 1, 2015 to Restriction Requirement mailed Jul. 2, 2015", 7 pgs.

"U.S. Appl. No. 13/605,382, Restriction Requirement mailed Jul. 2, 2015", 8 pgs.

"U.S. Appl. No. 13/605,374, Final Office Action mailed Feb. 16, 2016", 30 pgs.

"U.S. Appl. No. 13/605,374, Response filed Jul. 18, 2016 to Final Office Action mailed Feb. 16, 2016", 12 pgs.

"U.S. Appl. No. 13/605,382, Non Final Office Action mailed Jun. 29, 2016", 13 pgs.

"U.S. Appl. No. 13/605,382, Final Office Action mailed Nov. 16, 2016", 19 pgs.

"U.S. Appl. No. 13/605,382, Response filed Sep. 29, 2016 to Non Final Office Action mailed Jun. 29, 2016", 9 pgs.

* cited by examiner

WWTP SENSOR CARTRIDGE

CLAIM OF PRIORITY

This application claims priority to Provisional Application No. 61/531,552 filed on Sep. 6, 2011.

BACKGROUND

Wastewater treatment plants (WWTPs) are utilized to process and purify water from industrial operations and municipal sources. In current implementations, the capacity of a WWTP is not scalable and its components are custom made for its source. As a result, WWTP components have to be designed to not only accommodate current demand, but any foreseeable increased demand. This increases the cost required to design, construct and maintain the WWTP.

In WWTP's there is a requirement to perform sensor analysis, UV purification and managing pumping to remove wastewater material within at WWTP basin or container. In prior art solutions, these activities are executed in an equipment room that is both fixed and expensive to modify, wherein each sensor has a separate housing and all components are linked together via expensive piping and structural reinforcements. These prior art solutions are both expensive and cumbersome and do not provide the ability to quickly and cost effectively replace faulty or broken components.

DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of an apparatus, system and method for housing control sensors in modular wastewater treatment containers. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
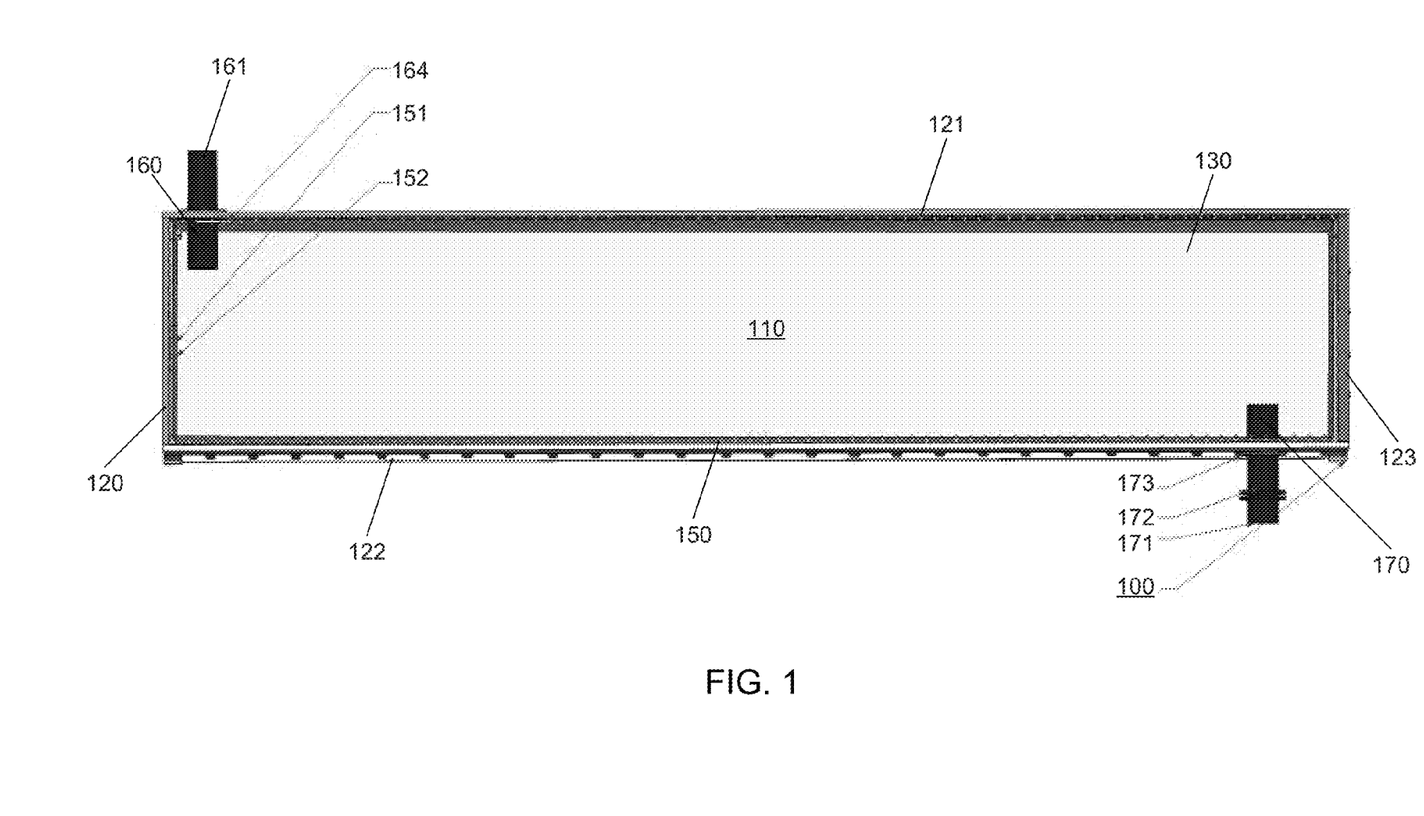
FIG. 1 is a top-view illustration of a modular wastewater treatment container according to an embodiment of the disclosure.

FIG. 1 is a top-view illustration of a modular wastewater treatment container according to an embodiment of the disclosure. In this embodiment, intermodal container 100 is consistent with any International Organization for Standardization (ISO) specification for intermodal containers (e.g., Technical Specification for Steel Dry Cargo Container, Spec. No. ITRU-40'-SA, Jun. 12, 2001)—e.g., container 100 may be a steel dry cargo container ISO IAA type 40'×8'×8'6" or 20'×8'×8'6". In this embodiment, the interior of container 100 forms basin 110 (and thus, the terms "container" and "basin" is used interchangeably herein to describe a similar structure). In other embodiments, a wastewater treatment basin may be included in container 100, but said basin's shape and volume may be independent of the dimensions of container 100.

FIG. 1 illustrates container 100 from a "top view," thus illustrating side walls 120-123 and gravitational bottom (i.e., base) 130. It is to be understood that references to "side walls" and "gravitational bottom" are used simply to distinguish the sides of the containers of the example embodiment. In other embodiments of the invention, the orientation of a container including a wastewater treatment basin may be such that a different side of the container is the "gravitational bottom."

Lining portions of the interior of container 100 with a corrosion resistant liner may form a basin to hold wastewater process material. In this embodiment, basin 110 is formed by lining the interior of container 100 with corrosive resistant liner 150. Liner 150 may comprise at least one layer of polyvinyl chloride (PVC), Low Density Polyethylene (LDPE) or High Density Polyethylene (HDPE) liner. It is to be understood that utilizing an ISO container and said liner material to construct a wastewater treatment basin significantly reduces the costs of said basin compared to materials used in the prior art (e.g., concrete and stainless steel). In one embodiment, liner 150 may be coupled to steel grommets (such as grommet 151), which are further fastened to the steel hooks (such as hook 152) on the inside of container 100. The steel hooks may be welded to the inside of sidewalls 120-123 at the gravitational top of container 100.

Container 100 further includes inlet 160 and outlet 170. In this embodiment, inlet 160 and outlet 170 are two circular holes cut into container sidewalls 121 and 122, respectively, and the corresponding portions of liner 150 to accommodate inlet and outlet pipes 161 and 171. Thus, wastewater flows in and out of the basin 100 via pipes 161 and 171. The inlet and outlet pipes may be secured to sidewalls 121 and 122 of container 100 by welding flanged L shaped pipe rings (e.g., pipe ring 173) to the interior and exterior of said container sidewalls.

It is to be understood that in other embodiments, an inlet and an outlet for the basin may be any opening that allows wastewater treatment process material to enter and exit the basin. Furthermore, it is to be understood that the inlet/outlet of a basin may be a single access point of the basin (e.g., an exposed portion of a gravitational top of a basin may function as both an inlet and an outlet).

Inlet pipe 161 and outlet pipe 171 may each be an HDPE pipe. The HDPE pipes may be inserted into pipe rings and held in place in the pipe rings by attaching the HDPE flanges (e.g., flange 172) to the HDPE pipe using socket fusion welding. HDPE flanges may be attached to a flanged pipe ring (e.g., pipe ring 173) with screws which may be collectively underneath liner 150. The perimeter of inlet 160 and outlet 170 may be secured to their respective HDPE pipes using a rubber gasket and an aluminium fastener (e.g., fastener 164) on the interior side of liner 150.

Container 100 enables a modular design approach for a wastewater treatment plant (WWTP) by subdividing said systems into smaller parts which may be easily manufactured and transported. For example, in the event increased capacity is desired, additional containers may be inexpensively added to meet the demand. Furthermore, WWTP components according to embodiments of the invention may be independently created and replaced, thereby reducing the labor and costs associated with lifetime maintenance of a WWTP.

Figure 2:
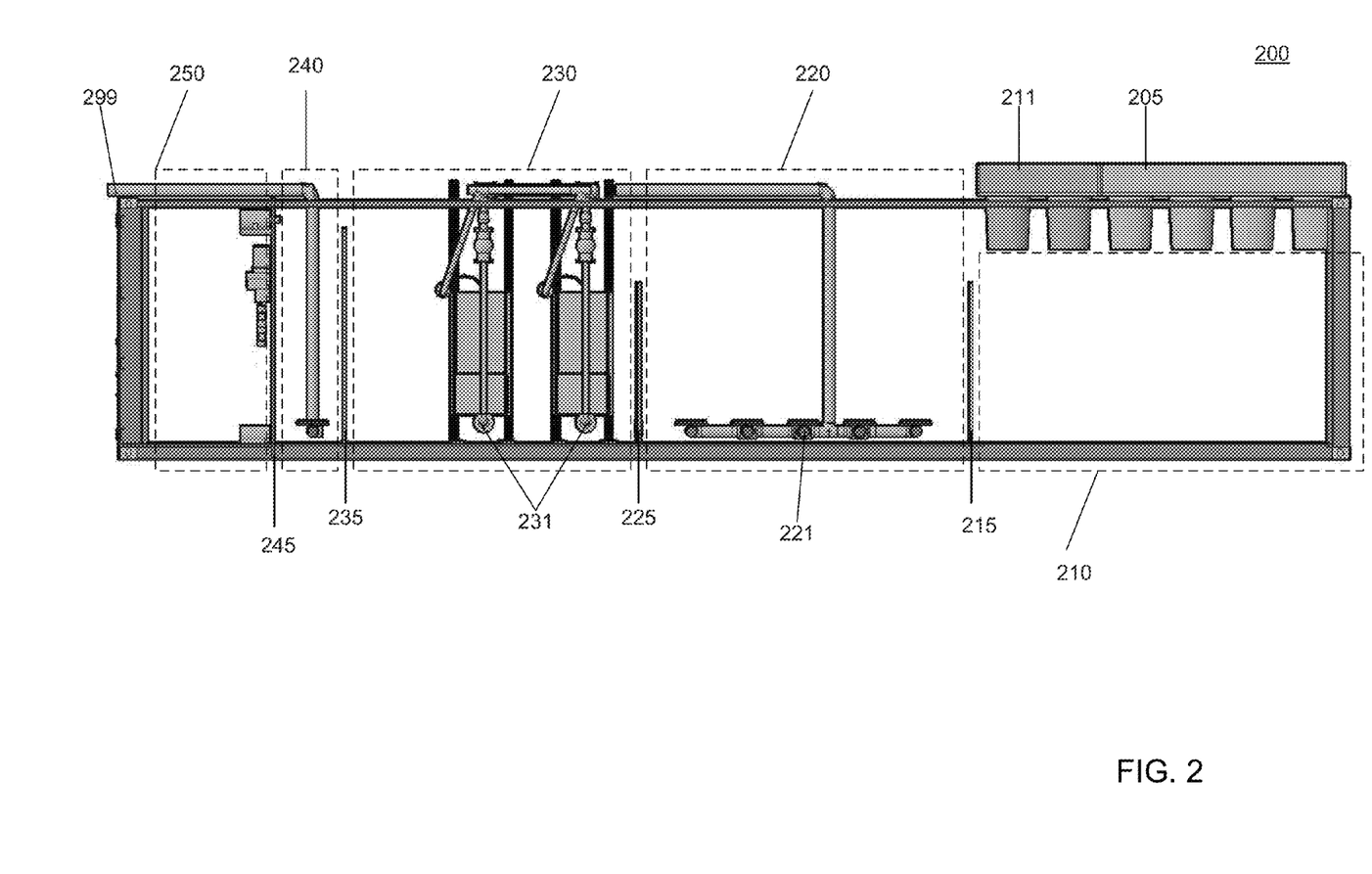
FIG. 2 is an illustration of a dynamically configurable and controllable wastewater treatment container having a plurality of basin compartments according to an embodiment of the disclosure.

FIG. 2 is an illustration of a dynamically configurable and controllable wastewater treatment container having a plurality of basin compartments according to an embodiment of the disclosure. In this embodiment, modular basin 200 includes a plurality of wastewater treatment compartments, each executing a specific wastewater treatment function.

In this embodiment, modular basin 200 receives wastewater from an influent source (e.g., a collection system) via headworks pipes 205 into anoxic compartment 210. In some embodiments, at the start of the wastewater purification process there is a requirement to remove all solids larger than a threshold value (e.g., 2 mm in diameter). This phase of treatment may be referred to as "headworks" processing. This processing may be executed in a standalone wastewater treatment container, or incorporated in a multi-function wastewater treatment container.

When anoxic conditions are desired, anoxic compartment 210 may divert air away from the wastewater influent via outlet 211 in order to execute an anoxic process (e.g., denitrification of nitrates and nitrites). Modular basin 200 further includes weir 215 disposed between anoxic compartment 210 and aeration compartment 220 (described below). In order for modular basin 200 to execute a plurality of wastewater treatment functions, certain water levels may be maintained in various wastewater treatment processing compartments. It is also desirable to take advantage of "gravity flow" in order to reduce the number of mechanical pumps necessary to move water within the modular basin. Weir 215 may be utilized in embodiments of the invention to address this problem. In one embodiment, weir 215 is an overflow barrier that forms a controlled waterfall to alter the flow characteristics of wastewater transferred from anoxic compartment 210 to aeration compartment 220. In another embodiment, weir 215 is a modified pipe-weir. Said weir may be affixed to one of the interior walls of modular basin 200, and may be lower in height or perforated with holes at the desired water level.

In the illustrated example embodiment, once anoxic compartment 210 is filled, the water overflows into adjacent aeration compartment 220 via weir 215. The wastewater remains at the weir wall height in anoxic compartment 210 in perpetuity, while the water level in aeration compartment 220 fluctuates as a function of the water coming into the anoxic compartment (i.e., wastewater received at input 205 of modular wastewater container 200).

Modular basin 200 further includes aeration (i.e., pre-air) compartment 220 to deliver a suitable amount of air into the wastewater influent received from anoxic compartment 210 to promote aerobic reactions (e.g., a reaction taking place in the presence of oxygen) within the basin via, for example, air bubbles, compressed air streams, or any means to inject air into the wastewater influent. Said aerobic reaction may reduce the biochemical oxygen demand (BOD) and may further nitrify ammonia present in the wastewater influent to nitrate.

In this embodiment, aeration compartment 220 utilizes a mixer and coarse aeration bubble diffusers; aeration is supplied to aeration compartment 220 via positive displacement aeration pumps 221 to pump pipe air to the diffusers.

Weir 225 controls the flow of wastewater influent from aeration compartment 220 to MBR compartment 230. Weir 225 may comprise any embodiment similar to that of weir 215.

MBR compartment 230 executes both bio-reactive treatment processes with membrane separation processes. MBR compartment 230 uses membranes to separate and concentrate the biomass by removing wastewater (as opposed to using settling processes). Furthermore, said MBR compartment may retain particulate matter, remove a high percentage of pathogens, and remove dissolved materials from the wastewater influent.

Membranes utilized by MBR compartment 230 may be of any material (e.g., synthetic or natural) or porosity determined based on system requirements (e.g., quality requirements of the effluent). For example, said MBR compartment may utilize reverse osmosis, nanofiltration, ultrafiltration, microfiltration, or any other solid/liquid separation membranes known in the art. Said membranes may be of any configuration suitable for modular basin 200 (e.g., sheet, hollow tube). In one embodiment, MBR compartment 230 utilizes polypropylene membrane filters comprising 0.4 micrometer pores.

In this embodiment, MBR compartment 230 includes air blowers 231 to provide aeration to the compartment to reduce BOD, convert ammonia to nitrate, and provide air scour to reduce fouling. Sodium hypochlorite may be pumped through the membranes of the compartment to prevent fouling of the membrane filters, and aluminum and magnesium sulfate may be fed into the MBR compartment to neutralize the pH levels of the wastewater influent.

Weir 235 controls the flow of wastewater influent from MBR compartment 230 to WAS compartment 240. Weir 235 may comprise any embodiment similar to that of weirs 215 and 225.

WAS compartment 240 may execute any solids processing means known in the art. In one embodiment, pipe 241 transfers WAS from basin 200 for further processing (e.g., disposal, solids discharging, etc.) via effluent pipe 299.

Control compartment 250 may monitor the operation conditions of the various compartments of basin 200, and may collect and transmit sensor data, manage the operation of the basin, bring the basin online or offline, etc. In this embodiment, liner wall 245 separates control compartment 250 from the wastewater treatment compartments described above. As described below, in some embodiments, control compartment 250 includes a removable pipe and sensor cartridge to monitor and collect data for various stages of WWTP processing within container 200.

The modular wastewater treatment basins described above allow for automated WWTP system planning and construction. Each individual basin may be uniformly constructed, stackable, and operable; enabling multiple WWTP system sites to have the same basin configurations, the same hardware, the same power and piping configurations, etc. Thus, a WWTP system site may be planned and designed based on a minimum amount of operating parameters.

Figure 3:
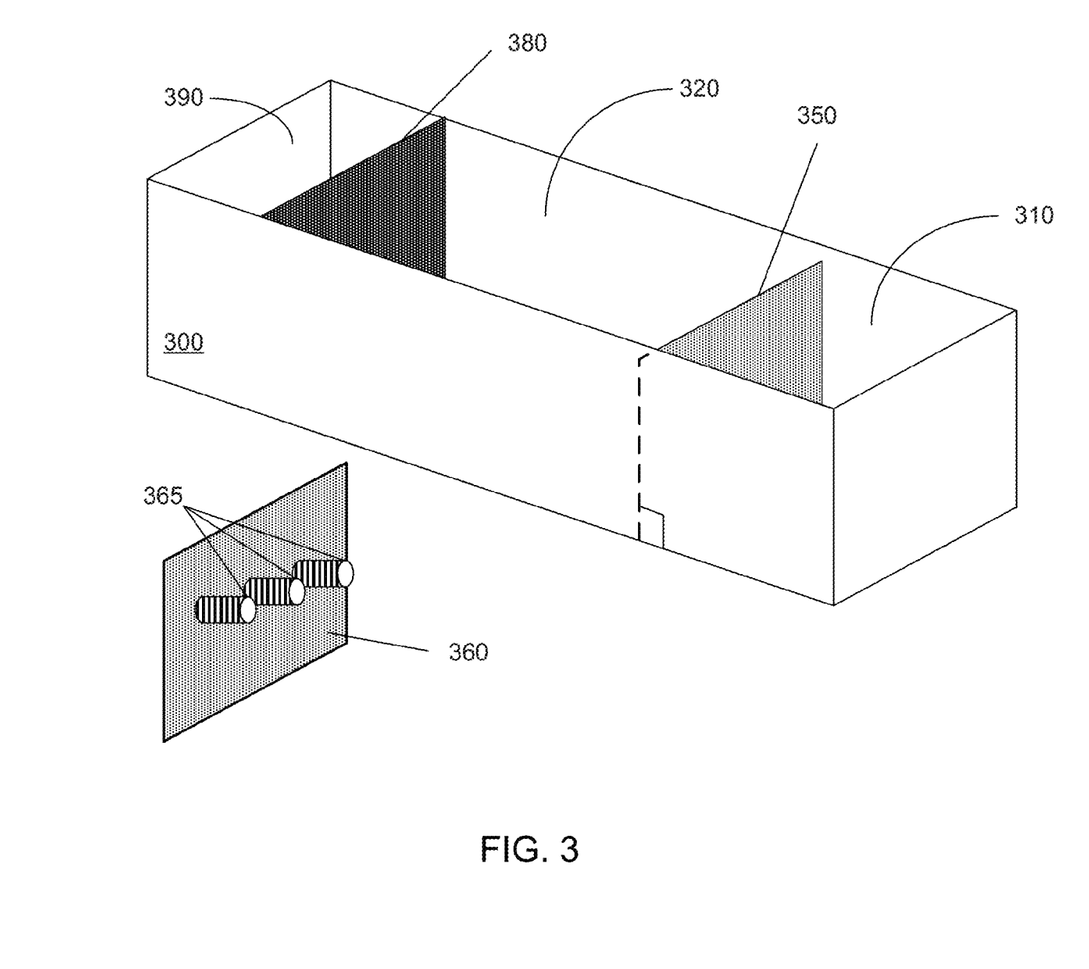
FIG. 3 is a block diagram of a modular wastewater treatment system container including a plurality of basin compartments according to an embodiment of the disclosure.

FIG. 3 is a block diagram of a modular wastewater treatment system container including a plurality of basin compartments according to an embodiment of the disclosure. In this embodiment, container 300 includes first basin compartment 310 and second basin compartment 320, each formed by the side walls of the container and by weir 350. Said weir may function as an overflow barrier that forms a controlled waterfall to alter the flow characteristics of wastewater transferred from compartment 310 to compartment 320.

As illustrated in FIG. 3, weir 350 is affixed to at least one of the interior walls of container 300, and is lower in height that the sides of the container to allow water to flow over the weir. In other embodiments, a weir may be perforated with holes at the desired water level (e.g., as illustrated by alternative weir 360 having flow means 365) to transfer wastewater material between compartments.

In this example, weir 350 is disposed perpendicular to the base of container 300. In other embodiments, said weir may be disposed offset from perpendicular to the base of container 300. Compartments 310 and 320 may execute the same wastewater treatment function or different functions— e.g., wherein the function of compartment 320 is dependent of the processing performed by compartment 310. In this embodiment, container 300 further includes control compartment 390 formed from sealed basin wall 380. In some embodiments of the invention, a wastewater treatment modular container includes multiple weirs (e.g., container 500 illustrated in FIG. 5).

Thus, basin compartments 310 and 320 may each perform any of the wastewater treatment processes described above (e.g., equalization, anoxic, MBR, aerobic, WAS). Furthermore, influent pre-treatment may include a sand or grit channel or chamber where the velocity of the incoming wastewater is adjusted to allow the settlement of sand, grit, stones, and broken glass. These particles may be removed to prevent damage to container pumps and other equipment. This pre-treatment may be executed in a standalone wastewater treatment container (e.g., container 100 of FIG. 1), or incorporated in a multi-function wastewater treatment container (e.g., incorporated into one of the basin compartments of container 300 of FIG. 3)

In some embodiments of the invention, fat and grease is removed by passing the wastewater influent through a basin or compartment where skimmers collect the fat floating on the surface. Air blowers in the base of the tank may also be used to help recover the fat as a froth. This removal process may be executed in a standalone wastewater treatment container (e.g., container 100 of FIG. 1), or incorporated in a multi-function wastewater treatment container (e.g., incorporated into one of the basin compartments of container 300 of FIG. 3).

In some embodiments of the invention, secondary treatment processes are executed to settle out the biological floc or filter material through a secondary clarifier and to produce sewage water containing low levels of organic material and suspended matter. This treatment process may be executed in a standalone wastewater treatment container (e.g., container 100 of FIG. 1), or incorporated in a multi-function wastewater treatment container (e.g., incorporated into one of the basin compartments of container 300 of FIG. 3).

For embodiments of the invention utilized to treat industrial wastewaters, biological oxidation processes use oxygen (or air) and microbial action. Surface-aerated basins or compartments may achieve 80 to 90 percent removal of BOD with retention times of, for example, 1 to 10 days. Said basins or compartments may range in depth from 1.5 to 5.0 meters and use motor-driven aerators floating on the surface of the wastewater. These biological oxidation processes may be executed in a standalone wastewater treatment container (e.g., container 100 of FIG. 1), or incorporated in a multi-function wastewater treatment container (e.g., incorporated into one of the basin compartments of container 300 of FIG. 3).

Trickling filter beds may be used where the settled sewage liquor is spread onto the surface of a bed made up of coke (i.e., carbonized coal), limestone chips or specially fabricated plastic media. Such media may have large surface areas to support the biofilms that form. The liquor is distributed through perforated spray arms. The distributed liquor trickles through the bed and is collected in drains at the base. These drains also provide a source of air which percolates up through the bed, keeping it aerobic. Filter beds may be included in a standalone wastewater treatment container (e.g., container 100 of FIG. 1), or incorporated in a multi-function wastewater treatment container (e.g., incorporated into one of the basin compartments of container 300 of FIG. 3).

In some embodiments of the invention, Biological Aerated (or Anoxic) Filter (BAF) or Biofilters are used to combine filtration with biological carbon reduction, nitrification or denitrification. A BAF may include a reactor filled with a filter media. The media is either in suspension or supported by a gravel layer at the foot of the filter. The dual purpose of this media is to support highly active biomass that is attached to it and to filter suspended solids. This biological aerated filtering process may be executed in a standalone wastewater treatment container (e.g., container 100 of FIG. 1), or incorporated in a multi-function wastewater treatment container (e.g., incorporated into one of the basin compartments of container 300 of FIG. 3).

Rotating biological contactors (RBCs) may be utilized in some embodiments of the invention as mechanical secondary treatment systems, which are robust and capable of withstanding surges in organic load. The rotating disks support the growth of bacteria and micro-organisms present in the sewage, which break down and stabilize organic pollutants. This rotating biological contactor process may be executed in a standalone wastewater treatment container (e.g., container 100 of FIG. 1), or incorporated in a multi-function wastewater treatment container (e.g., incorporated into one of the basin compartments of container 300 of FIG. 3).

In some embodiments of the invention, tertiary treatment is executed in the latter states of the wastewater treatment process to raise the effluent quality before it is discharged to the receiving environment (e.g., sea, river, lake, ground, etc.). More than one tertiary treatment process may be used at any treatment plant. If disinfection is practiced, this may be the final process (and may be referred to as "effluent polishing.") Furthermore, disinfection in the treatment of wastewater may be executed to substantially reduce the number of microorganisms in the water to be discharged back into the environment. Common methods of disinfection include ozone, chlorine, ultraviolet light, or sodium hypochlorite. These processes may be executed in a standalone wastewater treatment container (e.g., container 100 of FIG. 1), or incorporated in a multi-function wastewater treatment container (e.g., incorporated into one of the basin compartments of container 300 of FIG. 3).

Sand filtration may be utilized to remove much of the residual suspended matter. Filtration over activated carbon (also called carbon adsorption) removes residual toxins. This filtration process may be executed in a standalone wastewater treatment container (e.g., container 100 of FIG. 1), or incorporated in a multi-function wastewater treatment container (e.g., incorporated into one of the basin compartments of container 300 of FIG. 3).

The removal of nitrogen is effected through the biological oxidation of nitrogen from ammonia (nitrification) to nitrate, followed by denitrification, the reduction of nitrate to nitrogen gas. Nitrogen gas is released to the atmosphere and thus removed from the wastewater influent. Nitrification itself is a two-step aerobic process, each step facilitated by a different type of bacteria. The oxidation of ammonia (NH3) to nitrite (NO2-) is most often facilitated by *Nitrosomonas* (referring to the formation of a nitroso functional group). Nitrite oxidation to nitrate (NO3-), though traditionally believed to be facilitated by Nitrobacteria. (nitro referring the formation of a nitro functional group), is now known to be facilitated in the environment almost exclusively by Nitrospira. This nitrogen removal process may be executed in a standalone wastewater treatment container (e.g., container 100 of FIG. 1), or incorporated in a multi-function wastewater treatment container (e.g., incorporated into one of the basin compartments of container 300 of FIG. 3).

In some embodiments, phosphorus removal is used to limit nutrients for algae growth in fresh water systems. Phosphorus may be removed biologically in a process called enhanced biological phosphorus removal. In this process, specific bacteria, called polyphosphate accumulating organisms (PAOs) are selectively enriched and accumulate large quantities of phosphorus within their cells. Phosphorus removal can also be achieved by chemical precipitation, usually with salts of iron (e.g. ferric chloride), aluminum (e.g. alum), or lime. These phosphorous removal set of processes may be executed in a standalone wastewater treatment container (e.g., container 100 of FIG. 1), or incorporated in a multi-function wastewater treatment container (e.g., incorporated into one of the basin compartments of container 300 of FIG. 3).

Odors emitted by sewage treatment are typically an indication of an anaerobic or "septic" condition. Early stages of processing tend to produce smelly gases, with hydrogen sulfide being the most common in generating complaints. Large process plants in urban areas often treat the odors with carbon reactors, a contact media with bio-slimes, small doses of chlorine, or circulating fluids to biologically capture and metabolize the obnoxious gases. Other methods of odor control exist, including addition of iron salts, hydrogen peroxide, calcium nitrate, etc. to manage hydrogen sulfide levels. This odor control process may be executed in a standalone wastewater treatment container (e.g., container 100 of FIG. 1), or incorporated in a multi-function wastewater treatment container (e.g., incorporated into one of the basin compartments of container 300 of FIG. 3).

In some embodiments, a dewatering process is executed to remove the water from sludge. Dewatering can be characterized as the process of natural or mechanical removal of water from sludge during which sludge is losing its fluidity, becomes a damp solid and can be transported in bulk. The dewatering process may be executed in a standalone wastewater treatment container (e.g., container 100 of FIG. 1), or incorporated in a multi-function wastewater treatment container (e.g., incorporated into one of the basin compartments of container 300 of FIG. 3).

As described above, in some embodiments of the invention a modular wastewater treatment container is to include a plurality of basins. Said containers may utilize weirs to form these basins (alternatively referred to herein as "basin components.") In order for a modular wastewater treatment container to include a plurality of basin compartments that separately perform a wastewater treatment function, certain water levels should be maintained in the various compartments. It is also desirable to take advantage of "gravity flow" in order to reduce the number of mechanical pumps necessary to move water around within the modular wastewater treatment container.

Figure 4A:
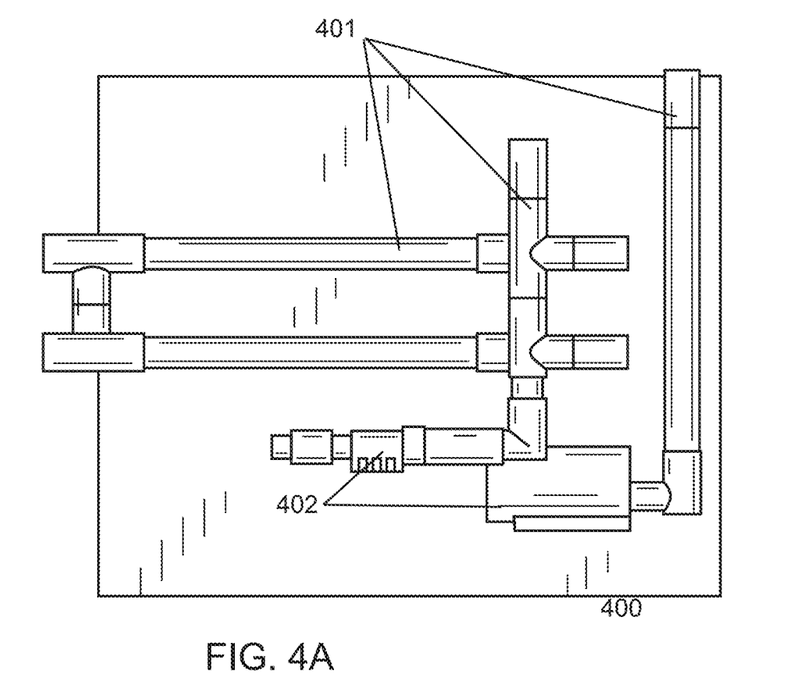
FIG. 4A-FIG. 4B are illustrations of a WWTP sensor cartridge according to an embodiment of the disclosure.
Figure 4B:
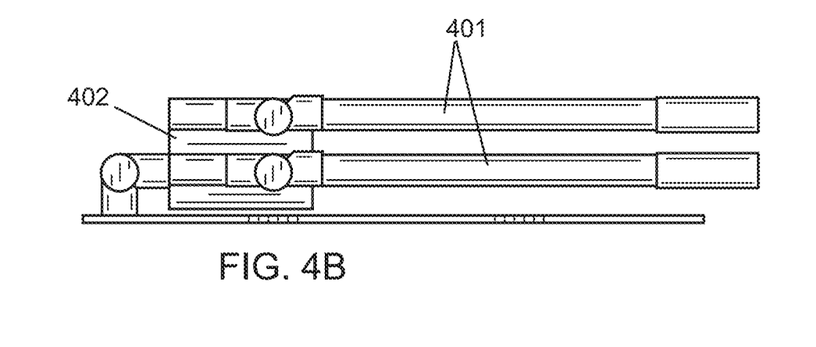

FIG. 4A-FIG. 4B are illustrations of a WWTP sensor cartridge according to an embodiment of the disclosure. Cartridge 400 may be constructed from any suitable material. In various WWTP systems there may be a requirement to perform sensor analysis, UV purification and pumping to remove wastewater material from, for example, the MBR basins described above. Utilizing prior art solutions would cause these activities to be executed in an Equipment room that is both fixed and expensive to modify, wherein each sensor has a separate housing and all components are linked together via expensive piping and structural reinforcements.

Embodiments of the invention may utilize a control compartment in a modular wastewater treatment container as described above (e.g., control compartment 250 of FIG. 2 and control compartment 390 of FIG. 3). FIG. 4A and FIG. 4B are illustrations of "pop in" cartridge 400 that enables quick replacement of the entire components of the control room (e.g., control logic described above, rerouting means for routing wastewater material to the different components of the container) efficiently. Embodiment cartridges may consist of, for example, sensors, a manifold for sensor attachment, piping, a permeate pump, UV and a check valve for the effluent. Cartridge 400 is an example implementation that includes pipes 401 to receive wastewater influent from different stages of wastewater processing, and sensors 402 to analyze and collect data describing the conditions of the wastewater at any given stage. In some embodiments, cartridge 400 further controls the operational state of its host WWTP container, by controlling power to the container or components within the container, controlling the wastewater influent routing means of the container, etc.

Cartridge 400 is designed to be attached to a fixed structure (e.g., a wall) that can be attached directly to the equipment room wall at the piping connectors. The equipment room wall may have a valve to close the flow of water during cartridge replacement. It may also have a connection location for both the influent coming into the structure and the effluent being removed from the structure. The wall sensors can be plugged and unplugged into the sensor electronics board upon installation and removal.

Cartridge-based solutions such as cartridge 400 enable the construction of the key equipment room components for effluent processing as a mass production activity. Furthermore these cartridges can be pre-tested and sensors can be pre-calibrated to ensure correctness. Once they have been installed in a container they can be replaced with little or no expertise and in very little time in a live (i.e., online) WWTP container. This approach reduces the required expertise for managing container based WWTPs in the field and also improves turnaround time for repairs. Instead of diagnosing a sensor problem, a maintenance professional can simply swap out the defective "board" for a non defective one.

Thus, embodiments of the invention describe a wastewater treatment container having a basin; the basin may include a base, a gravitational top opposite the base, a plurality of side walls, at least one wastewater treatment compartment executing a wastewater treatment function, and a control compartment securely separate from the wastewater treatment compartment(s) to monitor operation conditions of the wastewater treatment compartment(s).

Monitoring said operating conditions may be executed via control logic described above and at least one sensor included in a removable cartridge included in the control compartment (e.g., cartridge 400). In some embodiments, the sensor(s) is removably coupled to a sensor housing included in the cartridge.

In embodiments where said basin includes a plurality of wastewater treatment compartments, said cartridge may further include routing means to route wastewater material between the plurality of wastewater treatment compartments. The respective the control compartment may further include a shut-off value to prevent wastewater material from entering the control compartment (e.g., from entering the routing means of cartridge 400 in order to repair or replace the cartridge). In some embodiments, the container inlet and outlet are included in the cartridge. Said control logic may also be included in the cartridge.

Figure 5:
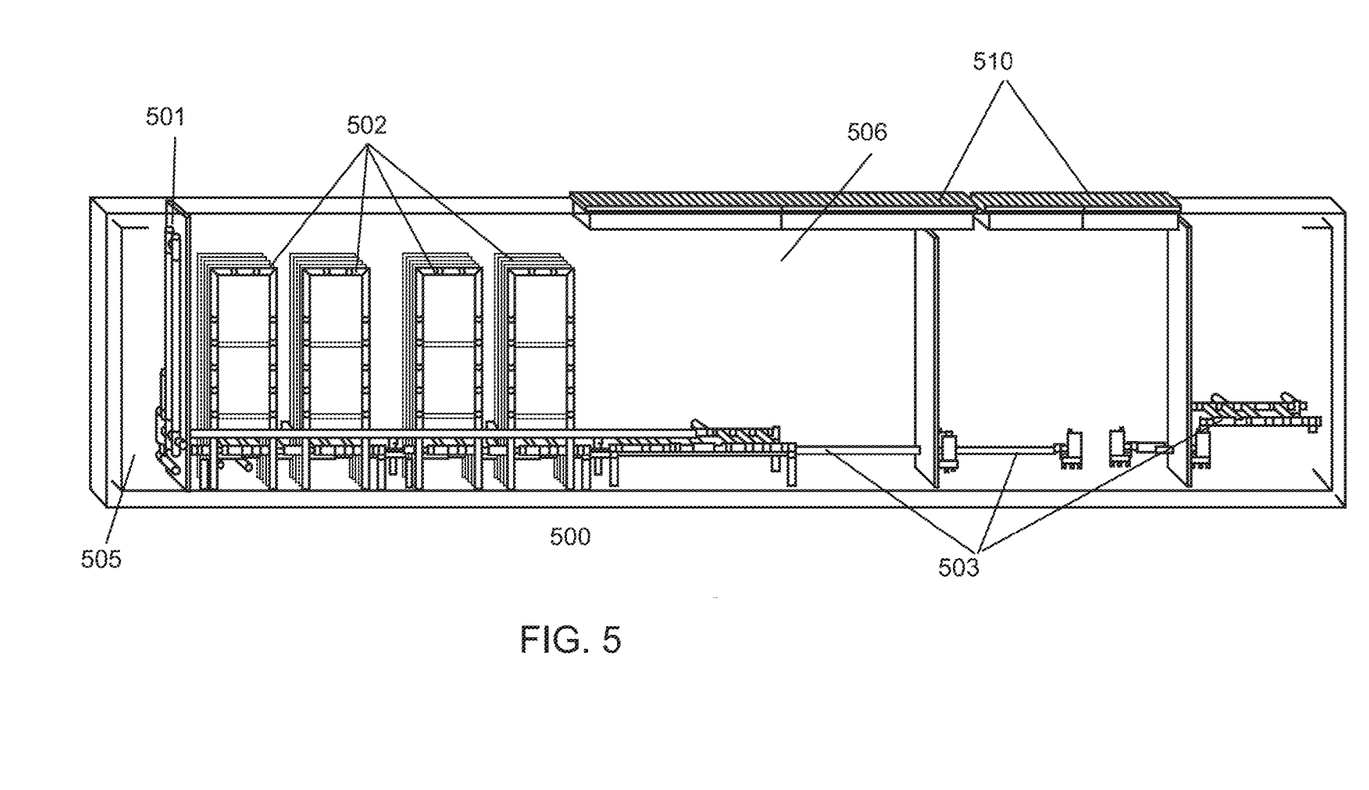
FIG. 5 is an illustration of a configurable WWTP container including a modular sensor and controller cartridge according to an embodiment of the disclosure.

FIG. 5 is an illustration of a configurable WWTP container including a modular sensor and controller cartridge according to an embodiment of the disclosure. In this embodiment, WWTP container 500 is shown to include removable cartridge 501 in compartment 505, MBR filter cartridges 502 in compartment 506, and waste water routing means 503. As described above, controller cartridge 501 and MBR filter cartridges 502 are modular components, and thus are removable and replaceable from container 500.

In this embodiment, removable cartridge 501 is capable of collecting and analyzing data for any given configuration of WWTP container 500. Thus, in this embodiment, removable cartridge 501 is securely separate from the wastewater treatment compartment(s) of container 500, and is able to monitor operation conditions of the wastewater treatment compartments (including compartment 506) and their components (e.g., MBR cartridges 502) via control logic and at least one sensor included in the modular cartridge.

WWTP container 500 is further illustrated to include roof access doors 510 that may be formed on a WWTP container to provide access to WWTP components according to an embodiment of the disclosure. In these illustrated embodiments, WWTP containers may have accessible sections on their gravitational top. While access doors 510 are shown to be folding panels (e.g., folding accordion style panels, spectrum panels), other embodiments may implement removable panels, sliding panels (i.e., similar to a sliding door configuration), roll-up panels, or any other functionally equivalent structures.

It is to be understood that such embodiments allow for a WWTP container consistent with ISO specifications to have an easily accessible access portion to inspect and replace various portions of the included basin (or basins), including equipment, sensors or ongoing wastewater treatment process.

Figure 6:
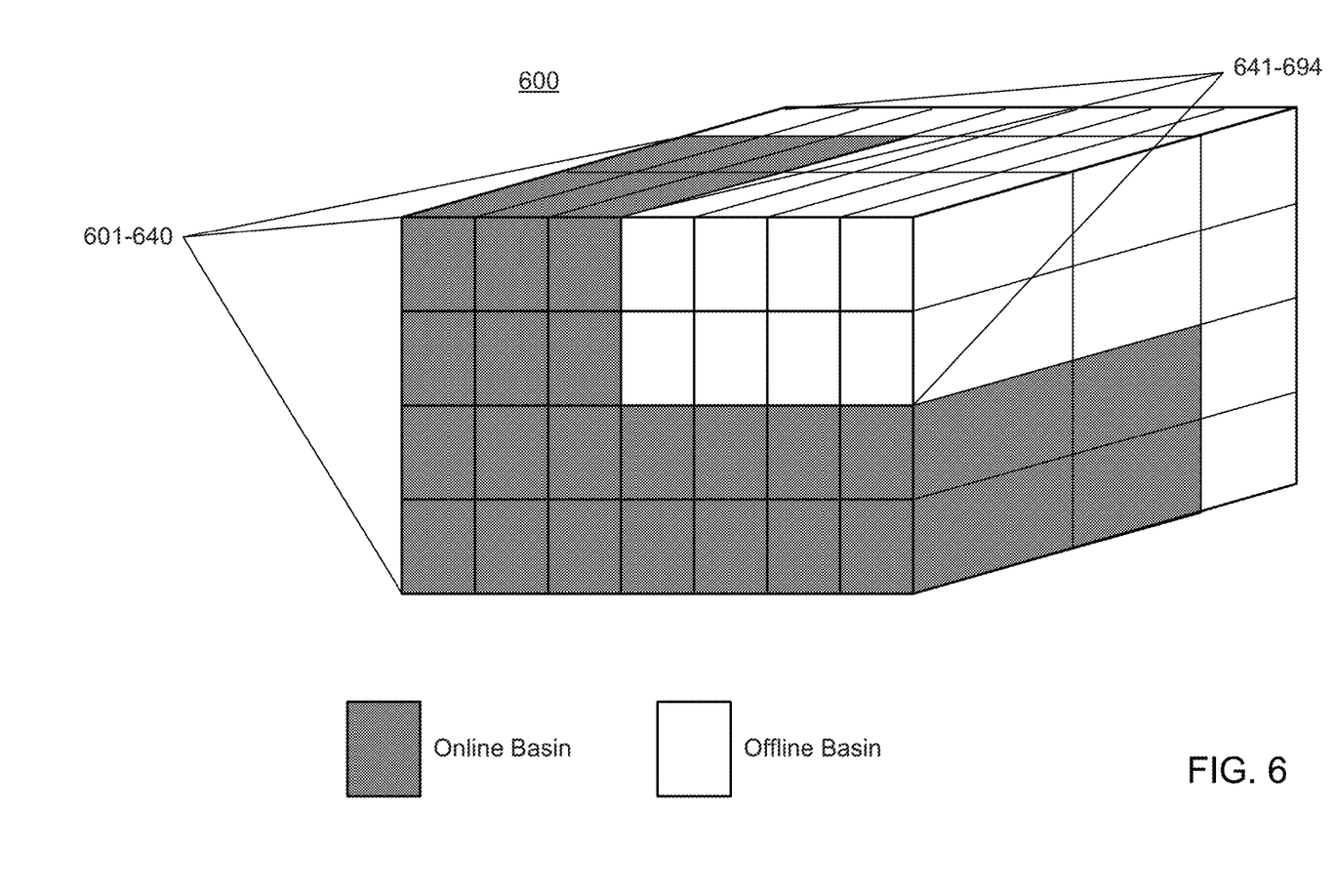
FIG. 6 is a block diagram of a plurality of modular wastewater treatment containers included in a wastewater treatment system according to an embodiment of the disclosure.

FIG. 6 is a block diagram of a plurality of modular wastewater treatment containers included in a wastewater treatment system according to an embodiment of the disclosure. In this embodiment, wastewater treatment system 600 includes plurality of containers 601-694. Said containers may be consistent with ISO specifications for intermodal containers as described above. In this embodiment, containers 601-694 act in concert to perform the same wastewater management function (e.g., containers 601-694 may function together as equalization basins, anoxic basins, etc.). In other embodiments, said containers may each perform a separate function (e.g., some containers may function as an aeration tank while others containers may function as a membrane basin), or may each perform a plurality of functions. In some embodiments, containers 601-694 may be utilized to form an entire WWTP, while in other embodiments said containers may augment a prior art wastewater treatment system.

In the illustrated embodiment, containers 601-640 are shown as being in an "online" state; for example, containers 601-640 may be configured to perform the function of an equalization basin, and thus are "online" to receive wastewater input flow for system 600. Containers 641-694 are shown as being in an "offline" state; for example, containers 641-694 are configured so they cannot receive wastewater input flow for system 600. In other words, as illustrated in this example containers 601-694 may represent the potential capacity of system 600, but system 600 has an actual capacity represented by containers 601-640.

System control module or logic may monitor the wastewater input (i.e., influent) flow of system 600, and determine whether the capacity of online containers 601-640 is higher than the input flow; if the input flow is higher, some of offline-basins 641-694 are brought online to increase the operational capacity of system 600. As discussed above, embodiment WWTP containers include modular control cartridges for activating the container (i.e., bringing the container from an offline state to an online state) and for monitoring operation conditions.

Thus, the expansion of system 600 may be incremental, with no additional construction to the WWTP required. System control modules or logic may configure the capacity of system 600 in response to any system level event or operating parameter that may require the operational capacity of system 600 to be increased, such as a significant increase in input flow, changes to the input/output water quality of system 600, a determination that at least one of online containers 601-640 is malfunctioning, overflow/underflow conditions, etc. In some embodiment, said system control modules or logic receives individual container operational data from the modular control cartridges discussed above.

Figure 7A:
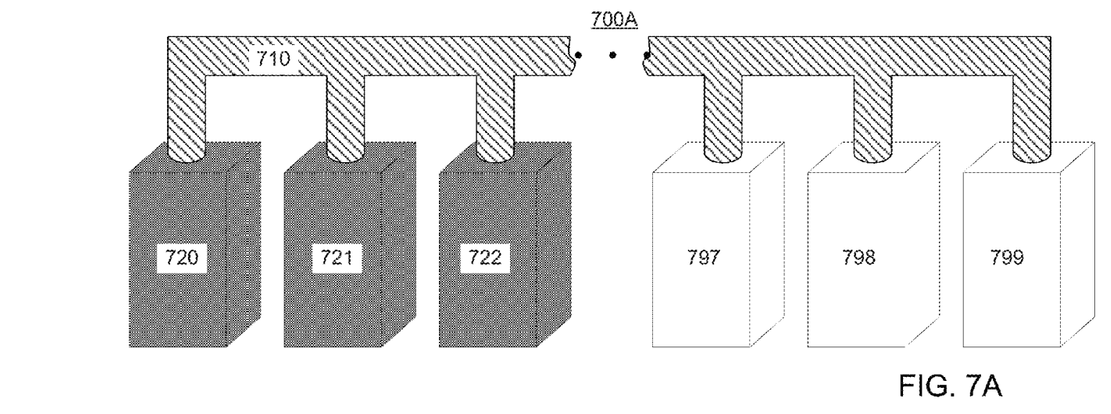
FIG. 7A-FIG. 7B illustrate an example configuration of a plurality of wastewater treatment basins according to an embodiment of the disclosure.

FIG. 7A-FIG. 7B illustrate an example configuration of a plurality of wastewater treatment basins according to an embodiment of the disclosure. In this embodiment, wastewater treatment system 700A as shown in FIG. 7A includes row of basins 720-799, having a subset of online basins (shown to include basins 720, 721 and 722) and a subset of offline basins (shown to include basins 797, 798 and 799). Said basins perform the same function (or functions) and are coupled in parallel—i.e., each of the basins receives wastewater input in parallel from inlet 710. This configuration allows for parallel processing of the wastewater input, as well as a relatively short water path (as compared to embodiments of the invention having basins coupled in series, as described below).

Figure 7B:
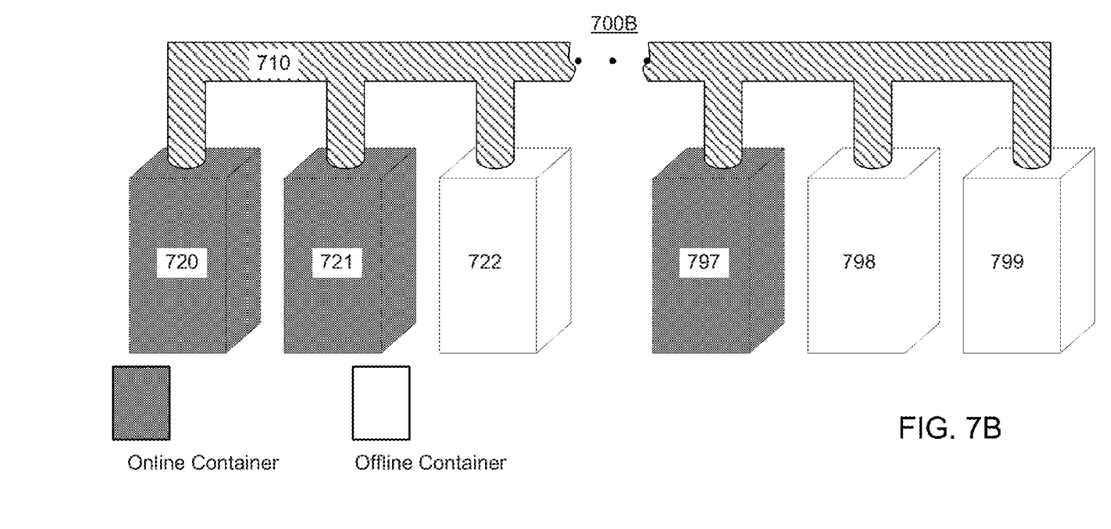

In this example, control logic of system 700 determines that online basin 722 is malfunctioning from data received by a removable control cartridge (as described above) included in basin 722; thus the basin is brought offline, as shown in wastewater treatment system 700B of FIG. 7B. In this embodiment, the failure of a basin does not affect the functionality of the wastewater treatment system, due to the redundancy of the remaining online basins (shown as basins 720 and 721). Thus, basin failures are isolated so as to not affect functional basins. If the control logic of system 700 determines that the operational capacity of the remaining online basins is insufficient to process the volume of wastewater input 710, then offline basin 797 may be brought online (as shown in FIG. 7B) by sending an activation signal to the removable control cartridge of basin 797.

Figure 8A:
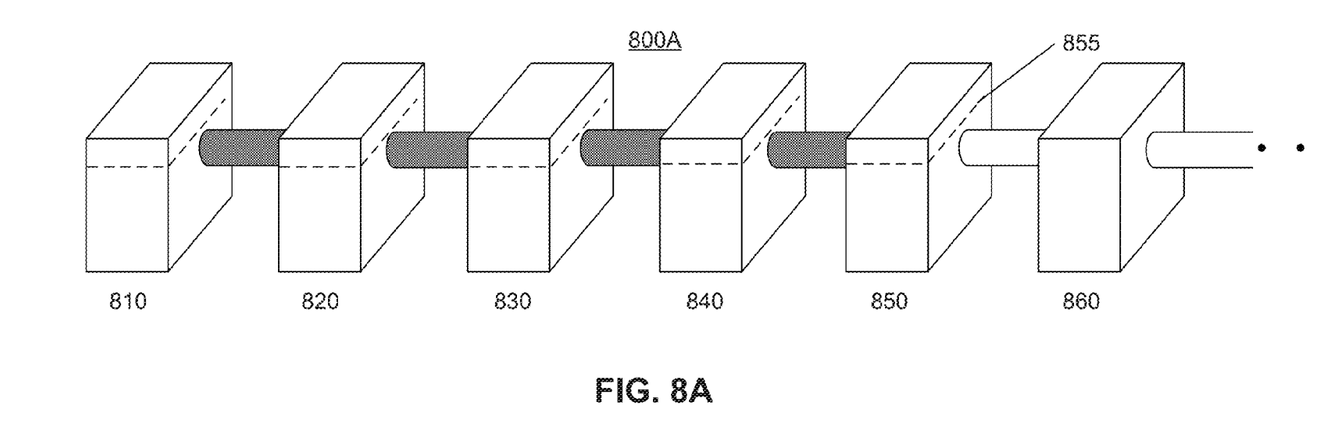
FIG. 8A-FIG. 8B are block diagrams of a row of wastewater treatment basins according to an embodiment of the disclosure.

FIG. 8A-FIG. 8B are block diagrams of a row of wastewater treatment basins according to an embodiment of the disclosure. As illustrated in FIG. 8A, system 800A includes a row of basins coupled in series and performing the same function (or functions). Said row of basins includes a subset of online basins (shown to include basins 810, 820, 830, 840 and 850), and a subset of offline basins (shown to include basin 860).

In this embodiment, each of the basins of system 800 is shown to have a high water-mark (e.g., mark 855 of basin 850), to indicate that the wastewater input flow for the respective basin is higher than a "threshold level," which may represent, for example, the capacity of the basin, and "ideal" volume for the basin, etc. In other embodiments, a basin may also have a low-water mark to indicate that the wastewater input flow for the respective basin is lower than an operating capacity for the basin, lower than an "ideal" volume for the basin, etc. Said high and low water marks are determined based on sensor data received and analyzed by the modular control and sensor cartridges discussed above.

Figure 8B:
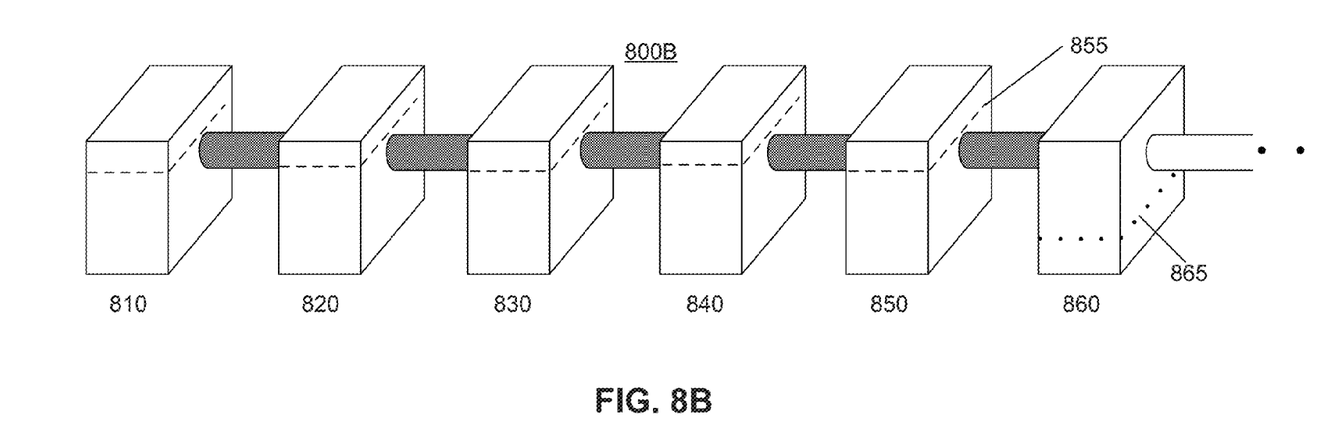

In this example, system control modules or logic may receive data from each container's modular control and sensor cartridge and determine that each of basins 810-850 contains a volume of wastewater that exceeds its respective watermark. In response to this determination, basin 860 (or a plurality of basins including basin 860) is brought online as shown in system 800B. The volume level of basin 860 is shown as level 865 and lower is than basins 810-850. System control logic may not determine to bring additional offline basins online until the level of basin 860 exceeds its watermark. In other embodiments, system control modules or logic may determine to increase the amount of online basins based on operating parameters such as changes to input/output water quality, basin malfunction, etc.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. An apparatus comprising:
 a wastewater treatment container, including:
  a base wall and a plurality of side walls;
  a first wastewater treatment compartment executing a first wastewater treatment function at a first stage of wastewater processing;
  a second wastewater treatment compartment executing a second wastewater treatment function at a second stage of wastewater processing;
  a control compartment separated by a wall from the first wastewater treatment compartment and the second wastewater treatment compartment, the wall having a first connector in the control compartment to receive first wastewater influent and a second connector in the control compartment to receive second wastewater treatment influent, the first wastewater influent being received from the first wastewater treatment compartment and the second wastewater influent being received from the second wastewater treatment compartment; and
  a removable cartridge removably coupled to the wall at the first connector in the control compartment and at the second connector in the control compartment, the removable cartridge including:

a first pipe to receive the first wastewater influent via the first connector and a second pipe to receive the second wastewater influent via the second connector;

a first sensor to generate data describing the first wastewater influent at the first stage;

a second sensor to generate data describing the second wastewater influent at the second stage;

routing means for routing the first wastewater influent and the second wastewater influent between the first wastewater treatment compartment and the second wastewater treatment compartment; and control means for controlling the routing means based on the first sensor data and the second sensor data.

2. The apparatus of claim 1, wherein the first sensor is removably coupled to a sensor housing included in the removable cartridge.

3. The apparatus of claim 1, wherein the control means is further for controlling power to the wastewater treatment container.

4. The apparatus of claim 1, wherein the control compartment further includes a shut-off valve to prevent the first wastewater influent and the second wastewater influent from cycling through the routing means.

5. The apparatus of claim 1, wherein the removable cartridge further includes an inlet and an outlet of the wastewater treatment container.

6. A system comprising:
a plurality of wastewater treatment containers, each container including:
a base wall and a plurality of side walls;
a first wastewater treatment compartment executing a first wastewater treatment function at a first stage of wastewater processing;
a second wastewater treatment compartment executing a second wastewater treatment function at a second stage of wastewater processing;
a control compartment separated by a wall from the first wastewater treatment compartment and the second wastewater treatment compartment, the wall having a first connector to receive first wastewater influent and a second connector in the control compartment to receive second wastewater treatment influent, the first wastewater influent being received from the first wastewater treatment compartment and the second wastewater influent being received from the second wastewater treatment compartment; and
a removable cartridge coupled to the wall at the first connector and at the second connector, the removable cartridge including:
a first pipe to receive the first wastewater influent via the first connector and a second pipe to receive the second wastewater influent via the second connector;
a first sensor to collect data describing the first wastewater influent at the first stage, a second sensor to collect data describing the second wastewater influent at the second stage;
routing means for routing the first wastewater influent and the second wastewater influent between the first wastewater treatment compartment and the second wastewater treatment compartment; and
control means for determining whether to bring one or more of the plurality of wastewater treatment containers online or take one or more of the plurality of containers offline based on the first sensor data and the second sensor data.

7. The system of claim 6, wherein the first sensor is removably coupled to a sensor housing included in the removable cartridge.

8. The system of claim 6, wherein the control compartment further includes a shut-off valve to prevent the first wastewater influent and the second wastewater influent from entering the routing means.

9. The system of claim 6, wherein, for each of the plurality of wastewater treatment containers, the removable cartridge further includes an inlet and an outlet for wastewater processing.

10. The system of claim 6, wherein, for each of the plurality of wastewater treatment containers, the determining of whether to bring one or more of the plurality of wastewater treatment containers online or take one or more of the plurality of containers offline is based on an operational capacity of the plurality of wastewater treatment containers relative to input flow.

11. The system of claim 6, further comprising: a plurality of intermodal containers, each forming one of the plurality of wastewater treatment containers.

12. The apparatus of claim 1, further comprising: an intermodal container forming the wastewater treatment container.

13. The apparatus of claim 12, wherein the control compartment and the wastewater treatment compartment comprise two of a plurality of basin compartments of the intermodal container.

14. The apparatus of claim 1, wherein the wastewater treatment container comprises part of an industrial wastewater treatment plant, the control compartment is a room of the industrial wastewater treatment plant in which wastewater material is routed to other compartments of the wastewater treatment container, the other compartments including the wastewater treatment compartment.

* * * * *

UNITED STATES PATENT AND TRADEMARK OFFICE
CERTIFICATE OF CORRECTION

PATENT NO. : 9,669,330 B1
APPLICATION NO. : 13/605365
DATED : June 6, 2017
INVENTOR(S) : Reilly et al.

Page 1 of 1

It is certified that error appears in the above-identified patent and that said Letters Patent is hereby corrected as shown below:

In the Specification

In Column 5, Line 62, after "3)", insert --.--

In the Claims

In Column 13, Line 45-46, in Claim 6, after "connector", delete "in the control compartment"

Signed and Sealed this
Twenty-second Day of December, 2020

Andrei Iancu
*Director of the United States Patent and Trademark Office*